April 19, 1938. W. H. BASELT 2,114,952
CLASP BRAKE
Filed Nov. 13, 1936 2 Sheets-Sheet 2
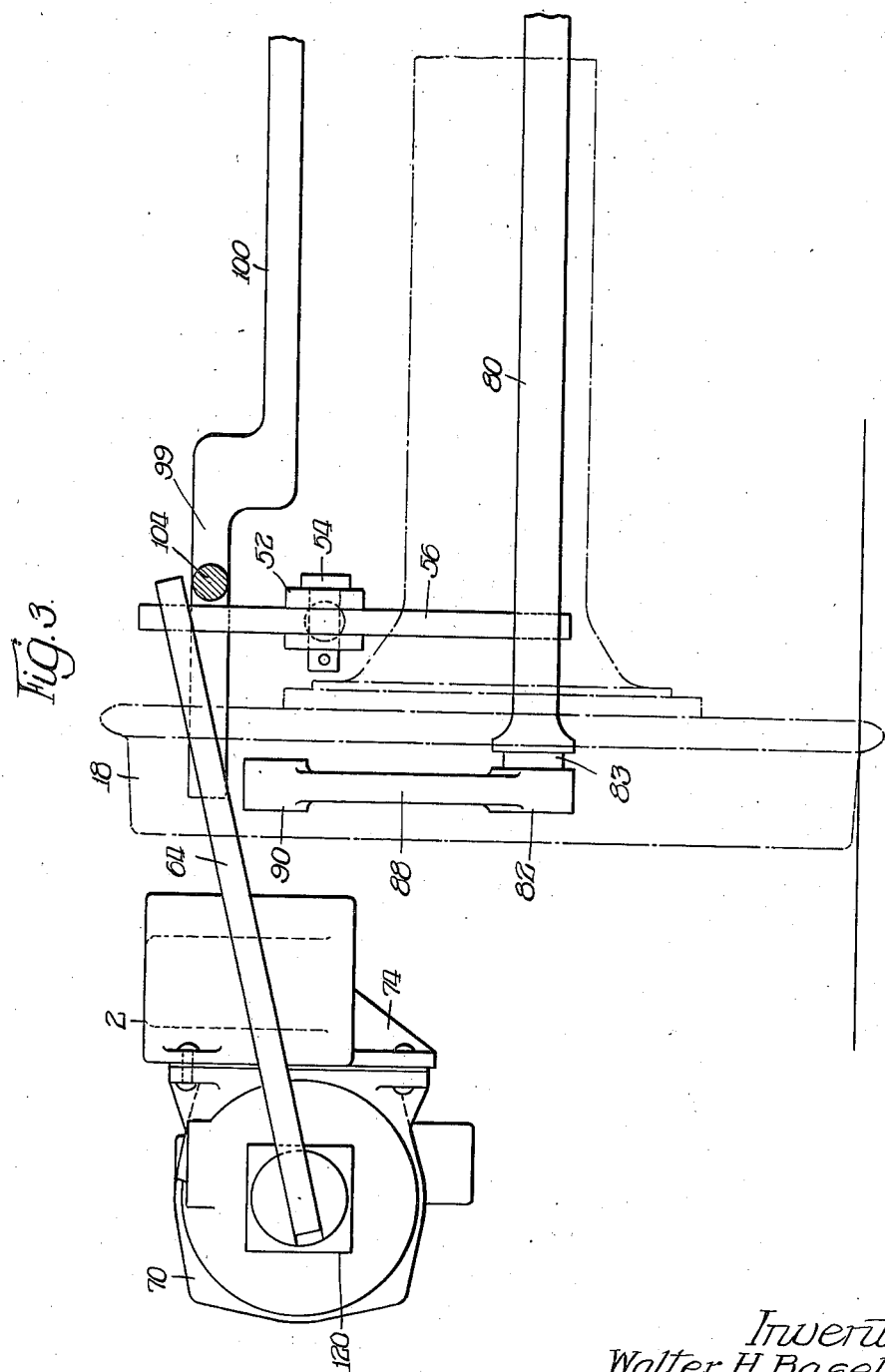
Inventor:
Walter H. Baselt, Patented Apr. 19, 1938

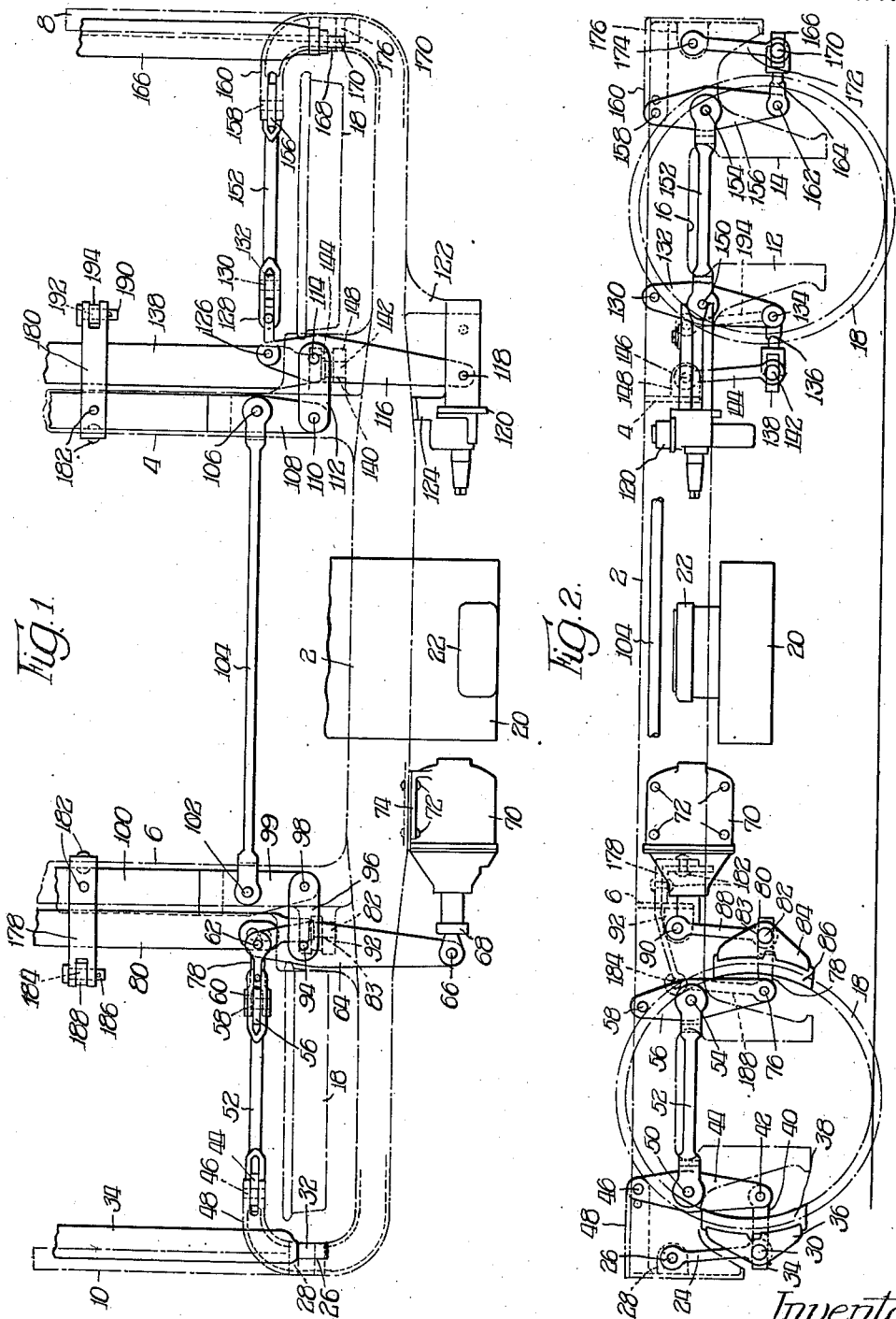

2,114,952

UNITED STATES PATENT OFFICE 2,114,952

CLASP BRAKE

Walter H. Baselt, Chicago, Ill., assignor to American Steel Foundries, Chicago, Ill., a corporation of New Jersey Application November 13, 1936, Serial No. 110,565

32 Claims. (Cl. 188—56)

My invention relates to brakes and particularly to brakes of the so-called clasp type wherein brake heads and brake shoes are supported on opposite sides of each wheel.

It is an object of my invention to provide a clasp brake arrangement for a high-speed truck, more particularly a design of such a truck suitable for use with the recently developed high-speed trains.

A further object of my invention is to provide a clasp brake arrangement of the unit cylinder type, that is, an arrangement wherein the power means is mounted on the truck proper, suitable for application to a truck having an exceptionally low center of gravity as well as a long wheel base.

Yet a further object of my invention is to provide a compact brake arrangement for a long wheel base truck having a low center of gravity and outboard side bearings, that is, a truck wherein the body receives balance against side sway by side bearing support outwardly of the truck frame side members.

Yet another object of my invention is to provide a clasp brake rigging for a truck of the above-mentioned characteristics wherein power means will be mounted on opposite sides of the truck to operate in unison for actuation of the complete brake rigging.

With these and various other objects in view, my invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a top plan view of a truck construction embodying my invention, only one-half of the truck being shown inasmuch as the arrangement is the same on the opposite sides thereof;

Figure 2 is a side elevation of the truck and brake construction shown in Figure 1; and Figure 3 is a sectional view taken substantially on the transverse center line of the truck construction shown in Figures 1 and 2.

In each of the Figures 1 to 3, inclusive, certain of the parts shown in other figures are omitted in order to simplify and clarify the showing.

Describing the structure in more detail, the truck frame comprises side frames 2 as well as the integrally formed spaced transoms 4 and 6 and end rails 8 and 10. Adjacent each end, the side frame has spaced columns 12 and 14 forming therebetween the window opening 16 for association with the journal box (not shown) forming a means of connection between the side frame and the wheel and axle assembly 18. Between the spaced transoms 4 and 6 may be located a span bolster (not shown) providing support means for the center bolster 20 shown fragmentarily, said center bolster projecting beneath the side frame and outwardly thereof and supporting adjacent each end a side bearing 22 providing side balancing means for the car body (not shown).

Describing the brake structure more particularly, the hanger 24 (Figure 2, left) is pivotally supported at its upper end as at 26 from the bracket 28 integrally formed on the end rail 10. The lower end of the hanger 24 is pivotally connected as at 30 to the trunnion end 32 of the brake beam 34 and, likewise, at the pivotal point 30, is connected the brake head 36, with its associated brake shoe 38 arranged for cooperation with the adjacent wheel. Adjacent the end of the brake beam 34 is secured the fulcrum 40, the outer end of said fulcrum being pivotally connected as at 42 to the dead truck lever 44, the upper end of said dead truck lever having a pivotal and adjustable connection as at 46 to the bracket 48 integrally formed with the frame adjacent the juncture of the end rail with the side frame. Intermediate the ends of the dead lever 44 as at 50 is connected one end of the pull rod 52, the opposite end of said pull rod having a pivotal connection as at 54 to a point intermediate the ends of the live truck lever 56, the upper end of said live truck lever having a pivotal connection as at 58 to the clevis means 60, the opposite end of said clevis means being pivotally connected as at 62 to the inner end of the cylinder lever 64, the outer end of said cylinder lever having a pivotal connection as at 66 to the piston 68 forming a part of the power means 70. The power means 70 is secured to the side frame 2 outwardly thereof as by means of rivets 72—72, the side frame at that point having the integrally downwardly extending bracket 74 (Figure 3) facilitating the mounting of the power means 70.

The lower end of the live truck lever 56 is pivotally connected as at 76 to the fulcrum 78 which is fixed on the beam 80 adjacent an end thereof. On the trunnion end 83 of the beam 80 as at 82 is pivotally mounted the brake head 84 with its associated brake shoe 86 arranged for cooperation with the opposite side of the last-mentioned wheel and, likewise, at the pivotal point 82, is connected the lower end of the hanger 88, the upper end of said hanger having a pivotal connection as at 90 to the bracket 92 integrally formed on the transom 6 adjacent an end thereof.

Intermediate its ends as at 94, the cylinder lever 64 is pivotally connected to the link 96, the opposite end of said link having a pivotal connection as at 98 to the offset end 99 (Figure 3) of the auxiliary beam or cross-bar 100 and adjacent the end of said cross-bar as at 102 is pivotally connected an end of the pull rod 104, the opposite end of said pull rod having a pivotal connection as at 106 adjacent the corresponding end of the cross-bar 108 at the opposite end of the truck. Pivotally connected to the end of the cross-bar 108 as at 110 is the link 112, the opposite end of said link having a pivotal connection as at 114 to a point intermediate the ends of the dead slack adjuster lever 116, the outer end of said slack adjuster lever having a pivotal and adjustable connection as at 118 to the slack adjuster 120, said slack adjuster being secured on the brackets 122 and 124 integrally formed with the side frame 2.

The inner end of the slack adjuster lever 116 is pivotally connected as at 126 to the clevis means 128, said clevis means having at its opposite end a pivotal connection as at 130 to the upper end of the live truck lever 132. The lower end of said live truck lever 132 is pivotally connected as at 134 to the fulcrum 136 secured on the beam 138 adjacent an end thereof. On the trunnion end 140 of the beam 138 is pivotally connected as at 142 the lower end of the hanger 144, the upper end of said hanger having a pivotal connection as at 146 to the bracket 148 integrally formed with the transom 4 adjacent its juncture with the side frame 2. Likewise at the pivotal point 142 on the trunnion end of the beam 138, is connected a brake head with an associated brake shoe arranged for cooperation with the adjacent wheel, said brake head and brake shoe being mounted similarly to the brake head 84 and the brake shoe 86 inwardly of the wheel at the opposite end of the truck.

Intermediate its ends as at 150 the live truck lever 132 is pivotally connected to the pull rod 152, the opposite end of said pull rod having a pivotal connection as at 154 to a point intermediate the ends of the dead truck lever 156. The dead truck lever 156 is adjustably fulcrumed at its upper end as at 158 from the bracket 160 integrally formed with the frame at the juncture of the side frame 2 and the end rail 8. The lower end of the dead truck lever 156 is pivotally connected as at 162 to the fulcrum 164 which is secured to the brake beam 166 adjacent an end thereof. At the trunnion end 168 of the beam 166 is pivotally connected as at 170 the hanger 172, the upper end of said hanger having a pivotal connection as at 174 to the bracket 176 integrally formed with the frame adjacent the juncture of the side frame and the end rail.

Balancing means is provided for the brake beams intermediate the wheels by the spring brackets 178 and 180, said brackets being secured respectively to the transoms 6 and 4 as by means of rivets 182. The outer end of the spring bracket 178 is pivotally connected as at 184 through the medium of the pin and cotter assembly 186 to the upper end of the balance hanger 188, the lower end of the balance hanger being pivotally connected in the usual manner to the balancing fulcrum secured to the brake beam 80 at its midpoint. Likewise, the outer end of the spring bracket 180 is pivotally connected as at 190 through the pin and cotter assembly 192 to the upper end of the balance hanger 194, the lower end of said balance hanger being connected to the brake beam 138 in a manner similar to that which is described for the brake beam 80 at the opposite end of the truck.

In operation, actuation of the power means 70 causes the cylinder lever 64 to rotate in a clockwise direction about the pivot 94 intermediate its ends, thus causing the live truck lever 56 to rotate in a clockwise direction about the pivot 54 intermediate its ends and bringing the brake shoe 86 carried on the brake beam 80 into engagement with the periphery of the adjacent wheel. Continued actuation causes the live truck lever 56 to rotate in a clockwise direction about the pivot 76 at its lower end, thus moving the pull rod 52 to the right (Figures 1 and 2) and causing the dead truck lever 44 to rotate in a counter-clockwise direction about its point of support 46 until the brake shoe 38 carried by the brake beam 34 is brought into engagement with the opposite periphery of said wheel. Continued actuation of the power means causes the cylinder lever 64 to rotate in a clockwise direction about the pivot 62 at its inner end thus, through the link connection 96, moving to the left the cross-bar 100 (Figure 1) and the pull rod 104 connected thereto. Thus, the cross-bar 108 is also moved to the left and through its connecting link 112 causes the slack adjuster lever 116 to rotate in a counter-clockwise direction about its pivotal connection 118 with the slack adjuster 120 and through the clevis connection 128 at its inner end causing the live truck lever 132 to rotate in a counter-clockwise direction about the pivot 150 intermediate its ends, thus moving the brake beam 138 to the right until the brake shoe supported thereon is brought into engagement with the periphery of the adjacent wheel. Continued actuation causes the live truck lever 132 to rotate in a counter-clockwise direction about the pivot 134 at its lower end, thus moving the pull rod 152 to the left and rotating the dead truck lever 156 in a clockwise direction about its point of support 158 and moving the brake beam 166 to the left until the brake shoe supported thereon is brought into engagement with the opposite periphery of the last-mentioned wheel.

Release of the power means causes the parts to move in directions reverse to those just indicated until they assume their normal inoperative position. It will be understood that the method of operation is described as above in order to simplify it; and that the movement of the parts occurs substantially simultaneously. Likewise, as above indicated, it will be understood that the power means 70 operates in conjunction with a similar power means correspondingly located at the opposite side of the truck, thus actuating as a unit the brake rigging associated with the truck as a whole.

It is to be understood that I do not wish to be limited by the exact embodiment of my invention which is merely by way of illustration and not limitation as various and other forms of the device will of course be apparent to those skilled in the art without departing from the spirit of the invention or the scope of the claims.

I claim:

1. In brake rigging for a railway car truck the combination of a truck frame comprising side members, integrally formed end rails and spaced transoms, a load carrying member supported intermediate said transoms and having side bearings outwardly of said side members, wheel and axle assemblies, power means mounted on each of said side members, slack adjuster means mounted on each of said side members, and brake rigging comprising live and dead truck levers supported on opposite sides of each of said assemblies, connections between said live and dead truck levers adjacent each wheel, horizontal levers at one end of said truck having their inner ends connected to the adjacent live truck levers and their outer ends connected respectively to said power means, horizontal levers at the opposite end of said truck having their inner ends connected to adjacent live truck levers and their outer ends connected respectively to said slack adjuster means, and operative connections between said horizontal levers at one end of said truck and said horizontal levers at the opposite end of said truck, said connections comprising equalizers adjacent each wheel and axle assembly, links connecting the opposite ends of said equalizer to the adjacent horizontal levers respectively at points intermediate the ends of said levers, and pull rods connecting said equalizers adjacent their opposite ends respectively.

2. In a four wheel railway car truck the combination of a truck frame including side members, integrally formed end rails and spaced transoms, a load carrying member intermediate said transoms, said load carrying member extending outwardly of said side members, power means and slack adjuster means mounted on each of said side members, a wheel and axle assembly adjacent each end of said truck, and brake rigging associated with each of said assemblies, said rigging comprising brake beams supported at opposite sides thereof, live and dead truck levers supported on opposite sides of said assembly adjacent each wheel and connected intermediate their ends to each other, horizontal levers having their inner ends connected respectively to said live truck levers, said horizontal levers at one end of said truck having their outer ends connected respectively to said power means and said horizontal levers at the opposite end of said truck having their outer ends connected respectively to said slack adjuster means, and operative connections between said horizontal levers at the opposite ends of said truck, said connections comprising a pull rod adjacent each of said side members.

3. In brake rigging for a railway car truck the combination of a truck frame comprising side members, integrally formed end rails and spaced transoms, a load carrying member supported intermediate said transoms and having side bearings outwardly of said side members, wheel and axle assemblies, power means mounted on each of said side members, slack adjuster means mounted on each of said side members, and brake rigging comprising pairs of live and dead truck levers supported on opposite sides of each of said assemblies, connections between said live and dead truck levers adjacent each wheel, horizontal levers at one end of said truck having their inner ends connected to adjacent live truck levers and their outer ends connected respectively to said power means, horizontal levers at the opposite end of said truck having their inner ends connected to adjacent live truck levers and their outer ends connected respectively to said slack adjuster means, and operative connections between said horizontal levers at one end of said truck and said horizontal levers at the opposite end of said truck, said operative connections comprising pull rods adjacent each of said side members.

4. In brake rigging for a railway car truck the combination of a truck frame comprising side members, integrally formed end rails and spaced transoms, a load carrying member supported intermediate said transoms and having side bearings outwardly of said side members, wheel and axle assemblies, power means mounted on each of said side members, slack adjuster means mounted on each of said side members, and brake rigging comprising live and dead truck levers supported on opposite sides of each of said assemblies, connections between said live and dead truck levers adjacent each wheel, horizontal levers at one end of said truck having their inner ends connected to the adjacent live truck levers and their outer ends connected respectively to said power means, horizontal levers at the opposite end of said truck having their inner ends connected to adjacent live truck levers and their outer ends connected respectively to said power means, and operative connections between said horizontal levers at one end of said truck and said horizontal levers at the opposite end of said truck, said operative connections comprising an equalizer connected between said horizontal levers at each end of said truck, and pull rods connecting said equalizers.

5. In a railway car truck the combination of a truck frame including side frames, end rails and spaced transoms integrally formed therewith, a load carrying member supported intermediate said transoms and having its ends projecting outwardly of said side frames, power means and slack adjusting means mounted on each of said side frames, wheel and axle assemblies, and brake rigging comprising hangers supporting brake beams on opposite sides of each of said assemblies, dead truck levers supported outwardly of said assemblies, live truck levers supported inwardly of said assemblies, connections between the live and dead truck levers adjacent each wheel, cylinder levers having their outer ends connected to said power means respectively and their inner ends connected to adjacent live truck levers, slack adjusting levers having their outer ends connected respectively to said slack adjusting means and their inner ends connected to adjacent live truck levers, an equalizer connected at its opposite ends respectively to points intermediate the ends of said cylinder levers, and a spaced equalizer connected respectively at its opposite ends to points intermediate the ends of said slack adjusting levers, and an operative connection between said equalizers.

6. In a railway car truck the combination of a truck frame having side members, integrally formed end rails and spaced transoms, a load carrying member supported intermediate said transoms and having ends projecting outwardly of said side members, side bearings on said projecting ends, power means and slack adjuster means mounted on each of said side members on opposite sides of said side bearings, wheel and axle assemblies, and brake rigging comprising brake beams supported at opposite sides of each of said assemblies, dead truck levers supported outwardly of said assemblies, live truck levers supported inwardly of said assemblies, cylinder levers having their outer ends connected respectively to said power means and their inner ends connected to adjacent live truck levers, slack adjuster levers having their outer ends connected respectively to said slack adjuster means and their inner ends connected to adjacent live truck levers, and equalizers operatively connected respectively at their opposite ends to said cylinder levers and to said slack adjuster levers and connected intermediate their ends.

7. In a railway car truck the combination of a truck frame comprising side members and a transverse load carrying member having ends projecting outwardly of said side members, power means and slack adjuster means supported on said side members on opposite sides of said load carrying member, wheel and axle assemblies, and brake rigging associated with each of said assemblies, said rigging comprising brake heads and brake beams supported at opposite sides of the wheel and axle assembly, dead truck levers connected to the beam outwardly of said assembly adjacent each wheel, live truck levers connected to the beam inwardly of said assembly adjacent each wheel, connections between said truck levers adjacent each wheel, horizontal levers having their inner ends connected respectively to said live truck levers, a cross-bar having opposite ends connected respectively to points intermediate the ends of said horizontal levers, connections between cross-bars associated with the rigging at opposite ends of the truck, and connections between said power means and the rigging at one end of the truck and between said slack adjuster means and the rigging at the opposite end of the truck.

8. In a railway car truck the combination of a truck frame comprising side members and a transverse load carrying member having ends projecting outwardly of said side members, power means and slack adjuster means supported on said side members on opposite sides of said load carrying member, wheel and axle assemblies, and brake rigging associated with each of said assemblies, said rigging comprising hangers supporting brake beams on opposite sides of said assembly, dead levers connected to the beam outwardly of the assembly, live levers connected to the beam inwardly of the assembly, connections intermediate the ends of said live and dead levers adjacent each wheel, horizontal levers having their inner ends connected to said live truck levers and their outer ends connected respectively to said slack adjuster means and to said power means at opposite ends of the truck, a cross-bar having opposite ends connected respectively to points intermediate the ends of said horizontal levers, and operative connections between the cross-bars associated with said riggings.

9. In a four wheel railway car truck the combination of a truck frame comprising side members and a transverse load carrying member having side bearings outwardly of said side members, power means and slack adjusted means mounted on each of said side members on opposite sides of said load carrying member, and brake rigging associated with each wheel and axle assembly and including brake beams supported at opposite sides of said assembly, dead truck levers connected to the beam outwardly of said assembly, live truck levers connected to the beam inwardly of assembly, connections between said live and dead levers adjacent each wheel, horizontal levers having their inner ends connected respectively to said live truck levers, the horizontal levers at one end of said truck having their outer ends connected respectively to said slack adjusted means and at the opposite end of said truck to said power means and cross-bars associated respectively with said riggings and operatively connected to each other.

10. In a brake rigging for a four wheel railway car truck the combination of a truck frame having side members and a transverse load carrying member, a wheel and axle assembly adjacent each end of said truck, power means and slack adjuster means mounted on each of said side members at corresponding points thereof, and brake rigging at each end of said truck comprising hangers supporting brake beams on opposite sides of said assembly, live truck levers connected to the beam inwardly of said assembly, dead truck levers connected to the beam outwardly of said assembly, pull rods connecting the live and dead levers of each pair, horizontal levers having their inner ends connected to said live truck levers, a cross-bar having its opposite ends connected respectively to said horizontal levers, said horizontal levers at one end of said truck having their outer ends connected respectively to said slack adjuster means and said horizontal levers at the opposite end of said truck having their outer ends connected respectively to said power means, and operative connections between the cross-bars at the opposite ends of said truck.

11. In a four wheel railway car truck the combination of a truck frame comprising side members and a transverse load carrying member having side bearings outwardly of said side members, power means and slack adjuster means mounted on each of said side members on opposite sides of said load carrying member, and brake rigging associated with each wheel and axle assembly and including brake beams supported at opposite sides of said assembly, dead truck levers connected to the beam outwardly of said assembly, live truck levers connected to the beam inwardly of said assembly, connections between said live and dead levers adjacent each wheel, horizontal levers having their inner ends connected respectively to said live truck levers, a cross-bar having its opposite ends connected respectively to points intermediate the ends of said horizontal levers, and operative connections between said cross-bars at opposite ends of the truck, and between the rigging at one end of said truck and said slack adjuster means and between the rigging at the opposite end of said truck and said power means.

12. In a railway car truck the combination of a truck frame comprising side members and a transverse load carrying member having side bearings outwardly of said side members, power means mounted on said side members and slack adjuster means mounted on said side members, spaced wheel and axle assemblies, and brake rigging associated with each of said assemblies and comprising brake beams supported on opposite sides thereof, live and dead truck levers supported on opposite sides of the assembly, connections between the live and dead levers of each pair, horizontal levers having their inner ends connected respectively to said live truck levers, a cross-bar having its outer ends connected respectively to points intermediate the ends of said horizontal levers, pull rods connecting the cross-bars at the opposite ends of the truck, and operative connections between the rigging at one end of said truck and said slack adjuster means and between the rigging at the opposite end of said truck and said power means.

13. In a railway car truck the combination of a truck frame comprising side members and a transverse load carrying member having side bearings outwardly of said side members, power means and slack adjuster means mounted on said side members, spaced wheel and axle assemblies, and brake rigging associated with each of said assemblies and comprising brake beams supported on opposite sides thereof, live and dead truck levers supported on opposite sides of the assembly, connections between the live and dead levers of each pair, horizontal levers having their inner ends connected respectively to said live truck levers, a cross-bar having its outer ends connected respectively to points intermediate the ends of said horizontal levers, pull rods connecting the cross-bars at the opposite ends of the truck adjacent their corresponding ends, said horizontal levers at one end of said truck having their outer ends connected respectively to said slack adjuster means and said horizontal levers at the opposite end of said truck having their outer ends connected respectively to said power means.

14. In a railway car truck the combination of a truck frame comprising side members and a transverse load carrying member having side bearings outwardly of said side members, power means and slack adjuster means mounted on said side members, spaced wheel and axle assemblies, and brake rigging associated with each of said assemblies and comprising brake beams supported on opposite sides thereof, dead truck levers supported outwardly of the assembly, live truck levers supported inwardly of the assembly, connections between the live and dead levers of each pair, horizontal levers having their inner ends connected respectively to said live truck levers, a cross-bar having its ends connected respectively to points intermediate the ends of said horizontal levers, operative connections between the horizontal levers at one end of said truck and said slack adjuster means respectively and between the horizontal levers at the opposite end of said truck and said power means respectively, and operative connections between the equalizers at opposite ends of the truck.

15. In a railway car truck the combination of a truck frame comprising side members and a transverse load carrying member having ends projecting outwardly of said side members, power means and slack adjuster means supported on said side members on opposite sides of said load carrying member, wheel and axle assemblies, and brake rigging associated with each of said assemblies, said rigging comprising brake heads and brake beams supported at opposite sides of the wheel and axle assembly, dead truck levers connected to the beam outwardly of said assembly, live truck levers connected to the beam inwardly of said assembly, connections between said truck levers adjacent each wheel, horizontal levers having their inner ends connected respectively to said live truck levers, a cross-bar connected between points intermediate the ends of said horizontal levers, connections between cross-bars at opposite ends of the truck, and connections between said horizontal levers at one end of the truck and said power means respectively and between said horizontal levers at the opposite end of said truck and said slack adjuster means respectively.

16. In a brake rigging for a four wheel railway car truck the combination of a truck frame having side members and a transverse load carrying member, a wheel and axle assembly adjacent each end of said truck, power means and slack adjuster means mounted on each of said side members at corresponding points thereof, and brake rigging at each end of said truck comprising hangers supporting brake beams on opposite sides of said assembly, live truck levers connected to the beam inwardly of said assembly, dead truck levers connected to the beam outwardly of said assembly, pull rods connecting the live and dead levers of each pair, horizontal levers having their inner ends connected to said live truck levers, a cross-bar, links connecting the opposite ends of said cross-bar respectively to points intermediate the ends of said horizontal levers, said horizontal levers at one end of said truck having their outer ends connected respectively to said slack adjuster means and at the opposite end of said truck connected respectively to said power means, and pull rods connecting the equalizers at opposite ends of said truck.

17. In a four wheel railway car truck the combination of a truck frame including side members and a load carrying member extending outwardly of said side members, power means and slack adjuster means mounted on each of said side members, wheel and axle assemblies, brake beams supported at opposite sides of each of said assemblies, live and dead truck levers supported on opposite sides of said assemblies adjacent each wheel, connections between the live and dead levers of each pair, horizontal levers having their inner ends connected to said live truck levers and their outer ends connected respectively to said slack adjuster means at one end of said truck and connected respectively to said power means at the opposite end of said truck, and operative connections between said horizontal levers at the opposite ends of said truck.

18. In brake rigging for a railway car truck the combination of a truck frame comprising a side member and a load carrying member having a side bearing outwardly of said side member, power means and slack adjuster means mounted on said side member, wheel and axle assemblies, and brake rigging comprising brake heads and brake shoes applied at opposite sides of each of said assemblies, live and dead truck levers supported at opposite sides of each of said assemblies and connected intermediate their ends to each other adjacent each wheel, horizontal levers having their inner ends connected respectively to said live truck levers and their outer ends connected respectively to said power means and said slack adjuster means, and operative connections between points intermediate the ends of said horizontal levers.

19. In a brake arrangement the combination of a truck frame including a side frame and a transverse load carrying member having an end extending outwardly of said side frame, spaced wheel and axle assemblies disposed in supporting relation to said truck frame, brake rigging for each of said assemblies, said rigging comprising an equalizer, an operating cylinder supported on said side frame and connected to one of said riggings, a slack adjuster supported on said side frame and connected to the other of said riggings, and pull rods connecting the equalizers associated with the respective riggings.

20. In a brake arrangement the combination of a truck frame including side frames and a transverse load carrying member extending outwardly of said side frames, spaced wheel and axle assemblies disposed in supporting relation to said truck frame, brake mechanism associated with each of said assemblies and including brake beams on opposite sides of the wheels of each assembly and a cross-bar, slack adjuster means connected to opposite sides of the mechanism associated with one of said assemblies, power means connected to opposite sides of the mechanism associated with the other of said assemblies, and operative connections between said cross-bars.

21. In a four wheel railway car truck a framework including side members, power means and slack adjuster means on each of said side members, wheel and axle assemblies, braking means associated with each of said assemblies, live horizontal levers connecting power means on opposite side members to the braking means associated with one of said assemblies, dead horizontal levers connecting said slack adjuster means to the braking means associated with the other of said assemblies, and operative connections between said horizontal levers including a cross-bar.

22. In a four wheel railway car truck a framework including side members, power means and slack adjuster means on each of said side members, wheel and axle assemblies, braking means associated with each of said assemblies, live horizontal levers connecting power means on opposite side members to the braking means associated with one of said assemblies, dead horizontal levers connecting said slack adjuster means to the braking means associated with the other of said assemblies, and operative connections between said horizontal levers including a cross-bar having its ends connected respectively to points intermediate the ends of said dead horizontal levers.

23. In a four wheel railway car truck a framework including side members, power means and slack adjuster means on each of said side members, wheel and axle assemblies, braking means associated with each of said assemblies, live horizontal levers connecting power means on opposite side members to the braking means associated with one of said assemblies, dead horizontal levers connecting said slack adjuster means to the braking means associated with the other of said assemblies, and operative connections between said horizontal levers including a cross-bar having its opposite ends connected respectively to points intermediate the ends of said live horizontal levers.

24. In a four wheel railway car truck a framework including side members, power means and slack adjuster means on each of said side members, wheel and axle assemblies, braking means associated with each of said assemblies, live horizontal levers connecting power means on opposite side members to the braking means associated with one of said assemblies, dead horizontal levers connecting said slack adjuster means to the braking means associated with the other of said assemblies, and operative connections between said horizontal levers including cross-bars having their opposite ends connected respectively to said live horizontal levers and to said dead horizontal levers.

25. In a four wheel railway car truck a framework including side members, power means and slack adjuster means on each of said side members, wheel and axle assemblies, braking means associated with each of said assemblies, live horizontal levers connecting power means on opposite side members to the braking means associated with one of said assemblies, dead horizontal levers connecting said slack adjuster means to the braking means associated with the other of said assemblies, and operative connections between said horizontal levers including cross-bars having their opposite ends connected respectively to said live horizontal levers and to said dead horizontal levers, and pull rods at opposite sides of the truck connecting said cross-bars.

26. In a four wheel railway truck a framework including side members, wheel and axle assemblies, power means and slack adjuster means mounted on each of said side members, braking means associated with each of said assemblies, connections between said power means on opposite sides of the truck and the braking means associated with one of said assemblies and between the slack adjuster means on opposite sides of said truck and the braking means associated with the other of said assemblies, and operative connections between the braking means at opposite ends of the truck and including cross-bars adjacent each of said braking means and connected to each other adjacent opposite sides of the truck.

27. In a railway car truck a framework, wheel and axle assemblies, brake cylinders and slack adjusters supported on each side of said framework at corresponding points thereof, and braking means associated with each of said assemblies and including a cross-bar, operative connections between the braking means at one end of said truck and said brake cylinders, operative connections between the braking means at the opposite end of said truck and said slack adjusters, and pull rods connecting corresponding ends of the cross-bars at opposite ends of the truck.

28. A railway car truck having a framework, brake cylinders and slack adjusters mounted on opposite sides of said framework at corresponding points thereof, wheel and axle assemblies, braking means associated with each of said assemblies and including brake beams supported at opposite sides thereof, live levers connecting one of said braking means to said brake cylinders, dead levers connecting the other of said braking means to said slack adjusters, cross-bars having their opposite ends connected respectively to said live and dead horizontal levers, and operative connections between the cross-bars associated with the respective braking means.

29. A railway car truck having a framework, brake cylinders and slack adjusters mounted on opposite sides of said framework at corresponding points thereof, wheel and axle assemblies, braking means associated with each of said assemblies and including brake beams supported at opposite sides thereof, live levers connecting one of said braking means to said brake cylinders, dead levers connecting the other of said braking means to said slack adjusters, cross-bars having offset ends connected respectively to said live levers and to said dead levers, and pull rods connecting the offset ends of said cross-bars at opposite sides of the truck.

30. A four wheel railway truck having a framework with side members, a load carrying member having ends projecting outwardly of said side member, brake cylinders and slack adjusters similarly mounted on each of said side members on opposite sides of said projecting ends, wheel and axle assemblies, braking means associated with each of said assemblies, live levers connecting one of said braking means with said cylinders, dead levers connecting the other of said braking means with said slack adjusters, and operative connections between said live and dead levers, said operative connections including pull rods extending above said load carrying member.

31. A four wheel railway truck having a framework with side members, a load carrying member having ends projecting outwardly of said side member, brake cylinders and slack adjusters similarly mounted on each of said side members on opposite sides of said projecting ends, wheel and axle assemblies, braking means associated with each of said assemblies, live levers connecting one of said braking means with said cylinders, dead levers connecting the other of said braking means with said slack adjusters, operative connections between said live and dead levers, said operative connections including cross-bars interconnected between said live levers and between said dead levers respectively, and pull rods connecting said cross-bars.

32. A four wheel railway truck having a framework with side members, a load carrying member having ends projecting outwardly of said side member, brake cylinders and slack adjusters similarly mounted on each of said side members on opposite sides of said projecting ends, wheel and axle assemblies, braking means associated with each of said assemblies, live levers connecting one of said braking means with said cylinders, dead levers connecting the other of said braking means with said slack adjusters, operative connections between said live and dead levers, said operative connections including offset cross-bars interconnected between said live levers and between said dead levers respectively, and pull rods extending over said load carrying member and connecting the offset ends of said cross-bars at opposite sides of the truck.

WALTER H. BASELT.